Jan. 11, 1966 W. O. MATTENSON 3,228,044
AIR-SEA RESCUE DEVICE
Filed Jan. 27, 1964
FIG. 1
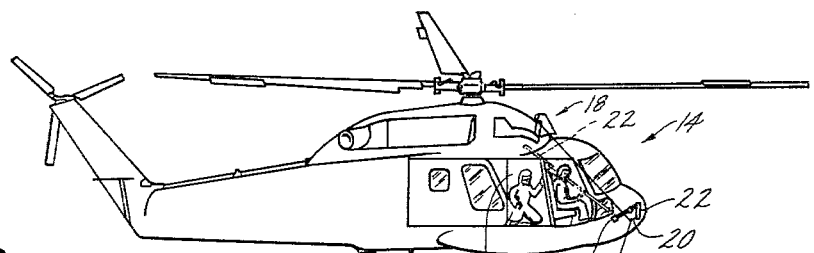
FIG. 2
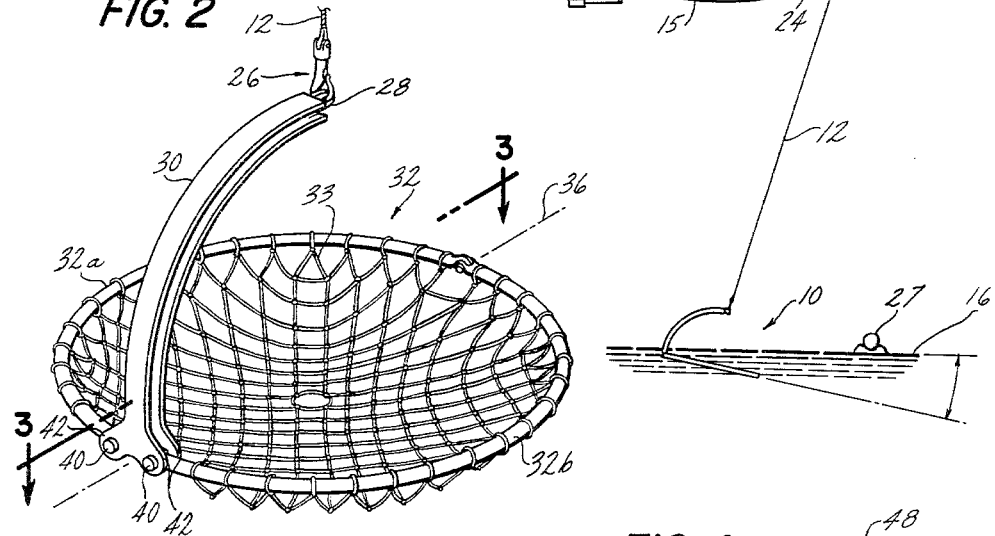
FIG. 3
FIG. 4
INVENTOR.
WALLACE O. MATTENSON
BY McCormick, Paulding & Huber
ATTORNEYS { # United States Patent Office 3,228,044
Patented Jan. 11, 1966

3,228,044
AIR-SEA RESCUE DEVICE
Wallace O. Mattenson, Thompsonville, Conn., assignor to Kaman Aircraft Corporation, Bloomfield, Conn., a corporation of Connecticut
Filed Jan. 27, 1964, Ser. No. 340,188
4 Claims. (Cl. 9—14)

The present invention relates to air-sea rescue devices, and more particularly to a personnel rescue net which is adapted to be supported from a hovering or slowly moving aircraft.

A general object of the present invention is to provide an air-sea rescue device which permits an immobilized survivor to be retrieved from the open sea without requiring an air crewman to leave the aircraft to assist the survivor.

Another general object of the present invention is to provide an air-sea rescue device which is adapted to be supported by a single cable from a hovering or slowly moving aircraft, which cable is so attached to the device that it does not interfere with the retrieval of a survivor.

Still another object of the present invention is to provide an air-sea rescue device which exhibits a high degree of hydrodynamic stability when towed at slow speeds across the uneven surface of the open sea.

A further object of the present invention is to provide an air-sea rescue device large enough to retrieve an immobilized survivor floating in the open sea, which device is also collapsible so as to be stored inside a small helicopter or other aircraft.

A still further object of the present invention is to provide an air-sea rescue device of simple and light construction having the requisite reliability for air-sea rescue operations and at the same time being relatively inexpensive to manufacture.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Of the drawing:

FIG. 1 is an elevational view of an air-sea rescue device of the present invention showing the same suspended from a slowly moving aircraft by a hoist cable;

FIG. 2 is a perspective view of the air-sea rescue device shown in FIG. 1;

FIG. 3 is a top view of the air-sea rescue device of FIG. 1; and

FIG. 4 is a view partly in elevation and partly in section, looking forwardly at the device of FIG. 1 in its collapsed or folded condition.

Referring now to the drawing in greater detail, FIG. 1 shows an air-sea rescue device 10 suspended by a hoist cable 12 from a slowly moving aircraft 14. The aircraft shown is a helicopter capable of hovering or moving slowly forwardly, as shown, with the major portion of the rescue device 10 submerged just below the surface of the water 16. The hoist cable 12 is connected at its upper end to a suitable winch 18, which may be of conventional construction, and at its lower end is releasably connected with the rescue device by means of a hook 26 fixed to the cable. The cable 12 may hang directly from the cable winch 18; however, in the illustrated aircraft the winch is located behind the pilot and therefore if the cable is so hung it will be difficult for the pilot to simultaneously maneuver the aircraft and maintain visual contact with the rescue operation. For this reason, the illustrated aircraft is equipped with a power-operated movable boom 22 which during the pick-up phase of the rescue operation has its outboard end located forwardly and laterally outwardly from the pilot, as shown by the full lines of FIG. 1. The cable in turn passes over a pulley 20 on the outboard end of the boom so that the suspended portion of the cable and the device 10 are easily visible to the pilot and so that the human factors involved in maneuvering the aircraft for the pick-up are accordingly improved. Although not shown in detail, the pulley 20 includes a housing attached to the boom and a sheave or other part which is removable from the housing to permit the cable to be readily connected with and disconnected from the pulley at any point along the length of the cable.

The inboard end of the boom is supported for pivotal movement relative to the body of the aircraft about a vertically inclined axis by a socket 24 located near the forward end of the aircraft, and suitable hydraulic or other power-driven means (not shown) are provided for moving the boom about such axis. As a result of such pivotal movement, the outboard end of the boom is movable from the extended position shown in full lines in FIG. 1 to a retracted position indicated by the broken lines of that figure. When the boom is in its retracted position, the outboard end thereof is positioned directly above the cargo door located behind the pilot's compartment. Thus, at the beginning of the rescue operation (at which time the boom is retracted), the rescue device may be readily attached to the cable and the cable in turn attached to the pulley by a crewman in the cargo compartment. Likewise, at the end of the rescue operation (when the boom is again retracted and the rescue device raised), the rescue device will be located adjacent the cargo door to facilitate removal of the survivor from the rescue device into the cargo compartment.

Reference is now made to FIGS. 2, 3 and 4 for a detailed description of the rescue device 10, and from which figures it will be noted that this device consists in general of a net 33, a net supporting frame 32 and a curved supporting arm or handle 30.

The frame 32 is foldable and extends around the periphery of the net 33. It may take any one of a variety of shapes, and as shown, it is, in its folded condition, generally hoop or circular shaped and has a diameter on the order of the height of the survivor 27, or about five feet. The frame 32, in the illustrated case, is made up of two semi-circular members or branches 32a and 32b which are movable relative to each other and to the supporting arm 30 about a fore and aft extending fold axis indicated at 36. The branches are of tubular cross section and each is hingedly connected at its aft end to the lower end of the supporting member 30 by a respectively associated bolt 40 which passes through the branch and through two spaced ears 42, 42 on the arm 30, as shown best in FIG. 3. The forward ends of the semi-circular branches 32a and 32b are hingedly connected to one another by a single pivot pin 44. Since two separate and spaced pivot bolts 40, 40 are employed for connecting the two branches 32a and 32b to the arm 30, each branch will in actuality have a fold axis slightly angularly displaced from that of the other branch; however, the two fold axes are so close to each other that they may for the present purposes be taken to be represented by the single axis 36.

The net 33 when spread has a generally circular periphery conforming in size to the frame 32. It is preferably woven from nylon cord and has openings small enough to preclude the ensnaring of the hands or feet of a survivor. At its periphery, the net includes a number of loops which surround the frame to secure the net thereto, and its size is preferably such as to allow it to assume a disked shape when the frame is in its unfolded condition so that a substantial part of the survivor's body will be located below the frame when the latter is suspended in the air.

The supporting arm or handle 30 extends upwardly and forwardly relative to the frame 32 to a point located approximately above the center of the frame. In order to minimize the size of the rescue device when collapsed, the member 30 is preferably curved to correspond approximately to the curvature of each of the frame branches 32a and 32b. At its lowermost end, the member 30 is connected to the frame 32 by the above-described pivot bolts 40, 40. At its uppermost end, and apertured lug 28 is provided to permit the rescue device 10 to be connected to the hoist cable 12 by means of the hook 26.

Still with reference to the supporting arm 30, stop means are provided thereon for preventing the foldable branches 32a and 32b from opening beyond the unfolded condition of FIGS. 2 and 3. As best shown in FIG. 4, said stop means includes a plate 46 welded to the lower end of the supporting arm between the ears 42, 42. This plate 46 is engaged by the aft ends 47, 47 of the frame branches to limit the unfolding movement thereof and is so located with respect to the pivot bolts 40, 40 that the frame branches 32a and 32b lie in a common plane when unfolded.

As so constructed the semi-circular branches 32a and 32b can assume an unfolded or spread condition or can be folded upwardly to collapsed positions adjacent the curved supporting arm 30 as best shown in FIG. 4. If desired, a short nylon strap 48, or similar means, may be tied around the collapsed branches to securely hold the device in its collapsed condition while not in use.

Turning now to the operation of the air-sea rescue device described herein, it will be apparent that in its collapsed or folded condition the device is relatively compact and can be readily stored in the cargo compartment of the aircraft 14. This compact shape of the device also permits a crew member to pass it through the cargo door after it is connected to the hoist cable 12. In an aircraft equipped with the pivotable boom shown, the boom at the start of the rescue operation is in the retracted position shown by the broken lines of FIG. 1. The cable 12 is accordingly within the reach of a crewman and is pulled by the crewman into the cargo compartment and the hook 26 attached to the lug 28. The tie strap 48, if any, is then removed and the device thereafter pushed out of the cargo door or hatch. As the device is pushed out of the cargo compartment, its weight is taken up by the cable and before lowering the device the crewman, if necessary, may grasp the branches of the frame to spread them to their unfolded positions. The cable is then paid out from the winch and simultaneously therewith the boom is moved to its forward or extended position, as shown by the full lines of FIG. 1. After the boom reaches its extended position, the paying out of the cable is continued to lower the rescue device to and partially beyond the surface of the water as shown in FIG. 1.

The aircraft is then moved slowly in such a direction as to move the rescue device toward the survivor. As the device moves relative to the water, it tends to assume the tilted position shown and the supporting arm or handle 30 tends to assume an aft position and to thereafter serve as a rudder to maintain the unobstructed portion of the frame 32 pointing forwardly. Accordingly, the open or unobstructed end of the device will be presented to the survivor to maximize the likelihood of a successful recovery by minimizing the possibility of the supporting arm 30 interfering with the entry of the survivor into the net. Also, if the survivor should strike the handle during his pick-up, the moments imposed on the device will generally be such as to tend to rotate the frame 32 and net 33 toward and under him to again improve the chances for a successful recovery.

Once the survivor is positioned in the net, the cable is hoisted until the device reaches the outboard end of the boom. The boom is then retracted and the hoist cable further drawn up until the rescue device and survivor are positioned directly outside the cargo door or hatch. The survivor may then be moved from the rescue device and into the cargo compartment by the crewman, or the helicopter may be flown to an aid station with the survivor remaining in the net during the flight. After the survivor is removed from the rescue device, it is released from the hook 26, collapsed, and again stowed in the cargo compartment or other storage place.

The invention claimed is:

1. An air-sea rescue device for use with a hoistable cable suspended from a hovering or slowly moving aircraft, said device comprising two semi-circular branches each having fore and aft ends, a curved upwardly extending supporting arm adapted at its upper end for connection to said cable, means pivotally connecting the fore ends of said branches to one another independently of said supporting arm and the aft ends of said branches to the lower end of said supporting arm for movement of said branches relative to one another and to said handle about a fold axis passing generally through said fore and aft ends of said branches and between folded positions whereat they are disposed generally parallel to the plane of said supporting arm and unfolded positions whereat they are disposed generally perpendicular to the plane of said supporting arm, said supporting arm in said unfolded positions of said branches having its lower terminus adjacent said aft end of said branches and being curved in such a direction as to extend generally along part of the length of said branches when said branches are in their folded positions, and a generally circular net peripherally attached to said frame.

2. An air-sea rescue device adapted for use with a cable suspended from a hovering or slowly moving aircraft, said device comprising a supporting arm having an upper end adapted for connection to a cable such aforesaid and also having a lower end, a frame made up of two similar generally C-shaped branches, means pivotally connecting one end of each of said branches to said lower end of said supporting arm, and means pivotally connecting the other end of one of said branches to the other end of the other of said branches independently of any connection to said supporting arm for movement of said branches between folded and unfolded positions relative to said supporting arm, said branches in their unfolded positions circumscribing a given planar area, and a net attached at its periphery to said frame so as to extend over said given area when said branches are in their unfolded positions, said supporting arm being so shaped and arranged relative to said branches that when said branches are in their unfolded positions said arm extends upwardly and inwardly relative to said branches from the periphery of said given planar area to space said upper end of said arm above the general center of said given area and so that no part of said arm is located within or below said given area.

3. An air-sea rescue device as set forth in claim 2 wherein said C-shaped branches are semi-circular and define a hoop-shaped frame in their unfolded positions, and said supporting arm being arcuate in shape and corresponding to the curvature of said branches so that in the folded condition of said branches said branches and said supporting arm are adjacent to one another and located in substantially the same curved plane whereby said device in its folded configuration has a vertical height of approximately one half the diameter of said unfolded hoop-shaped frame.

4. An air-sea rescue device as set forth in claim 3 and including coengageable stop means on said supporting member and on said branches for limiting the unfolding movement of said branches to said unfolded positions.

References Cited by the Examiner
UNITED STATES PATENTS

| 2,738,939 | 3/1956 | Johnson | 9—14 X |
| 3,036,315 | 5/1962 | Karnow | 9—14 |

MILTON BUCHLER, *Primary Examiner.*

FERGUS S. MIDDLETON, *Examiner.*